Nov. 17, 1931.　　　　R. G. ALLEN　　　　1,832,080
MACHINE FOR BLOWING HOLLOW GLASS ARTICLES
Filed Oct. 18, 1928　　　3 Sheets—Sheet 3
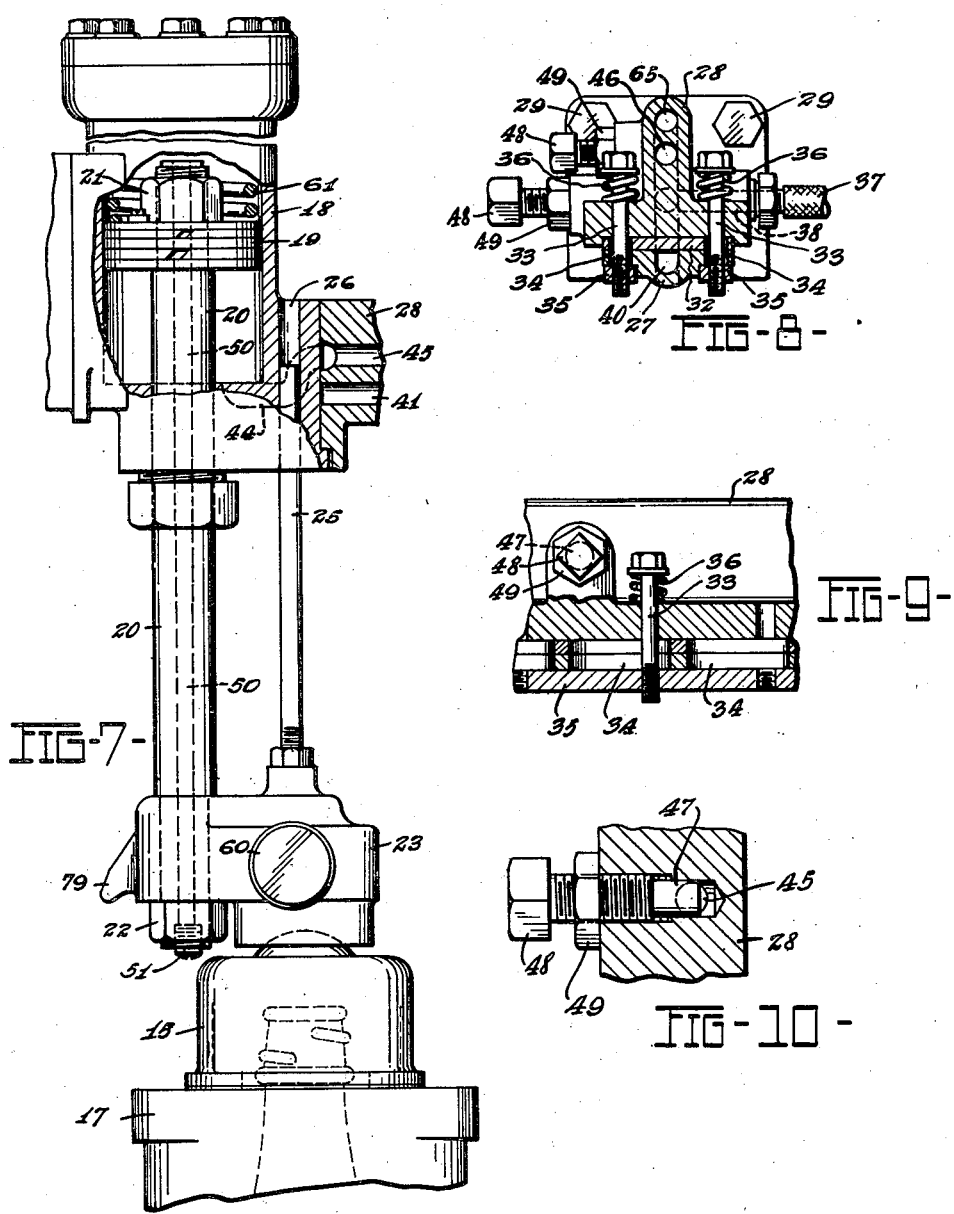

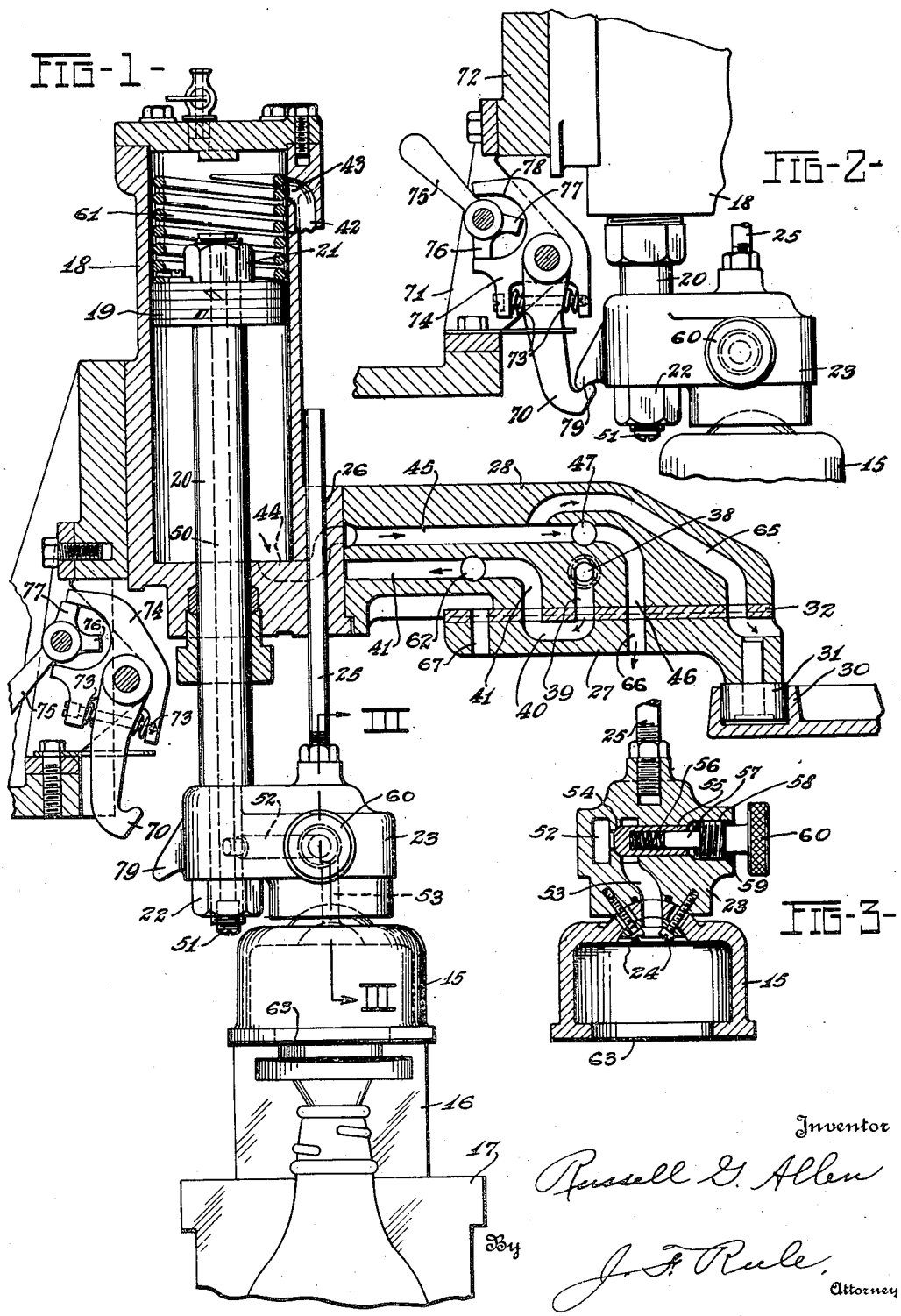

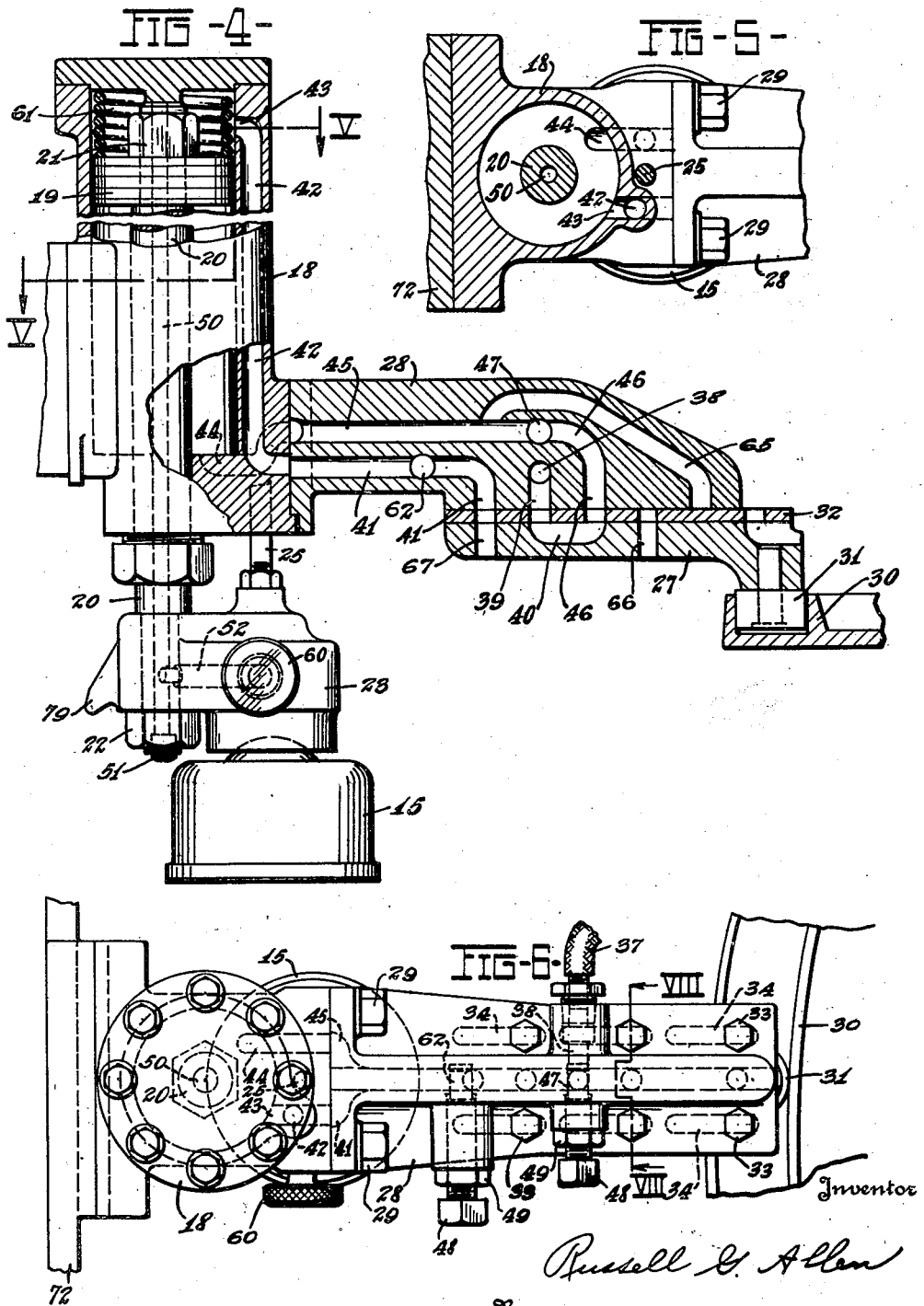

Patented Nov. 17, 1931

1,832,080

UNITED STATES PATENT OFFICE

RUSSELL G. ALLEN, OF TOLEDO, OHIO, ASSIGNOR TO OWENS-ILLINOIS GLASS COMPANY, OF TOLEDO, OHIO, A CORPORATION OF OHIO

MACHINE FOR BLOWING HOLLOW GLASS ARTICLES

Application filed October 18, 1928. Serial No. 313,248.

My invention relates to machines for forming hollow glass articles such as bottles, jars and the like, and particularly to the blowing heads and associated mechanism.

The invention as herein disclosed is embodied in a machine in which a finishing mold is closed around a parison of glass supported in a neck mold, after its initial formation in a blank mold. A blowing head is then brought into position over the neck mold and the parison blown in the finishing mold, after which the neck mold is opened and removed, the blowing head moved downward to seat on the finishing mold, and a further blowing operation is effected.

An object of my invention is to provide improved means for operating the blowing head and for controlling the supply of air through the blowing head to the mold. In the preferred form of the invention, the blowing head is lowered to operative position and lifted by means of an air operated piston motor. A feature of the invention relates to means whereby the motor piston is operated by air under comparatively low pressure to seat the blowing head on the mold, after which the air pressure is automatically built up in the motor and at a predetermined pressure opens a valve and admits air to the mold for the blowing operation.

A further object of the invention is to provide a latch mechanism adapted for holding and locking the blowing head in an inoperative position whenever it is desired to temporarily prevent operation of the blowing head.

Other objects of the invention will appear hereinafter.

In the accompanying drawings:

Fig. 1 is a part sectional elevation of apparatus constructed in accordance with my invention, and shows the blowing head seated on the neck mold.

Fig. 2 is a detail view showing the latch holding the blowing head in its elevated or inoperative position.

Fig. 3 is a section at the line III—III on Fig. 1, and shows the blowing head and the automatic valve for admitting air to said head.

Fig. 4 is a view similar to Fig. 1, but with certain parts omitted and showing the blowing head lifted to inoperative position.

Fig. 5 is a section at the line V—V on Fig. 4.

Fig. 6 is a top plan view of the mechanism shown in Fig. 4.

Fig. 7 is a part sectional elevation of the piston motor and blowing head, the latter being seated directly on the finishing mold.

Fig. 8 is a section at the line VIII—VIII on Fig. 6.

Fig. 9 is a fragmentary sectional elevation showing the spring held sliding connection between the relatively movable parts of the slide valve.

Fig. 10 is a detail showing an adjustable throttle valve.

Referring to the accompanying drawings, there is provided a blowing head 15 adapted to seat on a neck mold 16 which, as shown in Fig. 1, is above and in register with a finishing mold 17. Air is supplied through the blowing head as hereinafter described, for blowing to finished form, a parison contained in the neck and finishing molds. After this blowing operation, the blowing head may be lifted from the neck mold, the latter opened and moved to one side and the blowing head then moved downward to the Fig. 7 position to seat directly on the finishing mold 17 for a further blowing operation, all as set forth more fully hereinafter.

The blowing head is moved up and down by means of an air motor 18 comprising a vertically disposed cylinder in which a piston 19 is moved up and down. A piston rod 20 is secured to the piston by a nut 21 on the upper threaded end of the rod. A nut 22 threaded on the lower end of the piston rod, secures a block 23 to said rod. The blowing head 15 is secured to the block 23 by screw bolts 24 (Fig. 3) which extend freely through openings in the blowing head and are threaded into said block. The upper face of the blowing head is convex or spherical and fits against the correspondingly shaped concave face of the block 23. This permits universal tilting adjustment of the blowing head relative to said block so that it may be perfectly aligned with the face of the mold on which it seats. The openings through which the bolts 24 extend are enlarged to permit such adjustment. A guide rod 25 is rigidly connected at its lower end to the block 23 and extends upward through an opening 26 in the piston motor casing, said opening providing a bearing for the rod as the blowing head moves up and down.

The air supply for operating the piston motor and for blowing the parison in the molds is controlled by a valve comprising a slide plate 27, the upper horizontal face of which bears against the lower face of a valve block or arm 28 secured by bolts 29 to the motor casing. The valve slide 27 is moved horizontally toward and from the piston motor by means of a cam 30 which engages a cam roll 31 on the slide. The cam 30 may be stationary while the air motor, blowing head and molds are mounted on a mold carriage which rotates horizontally about the axis of the machine. The cam 30 is so shaped that it will impart periodic sliding movements to the valve slide as required to effect the operations of the piston motor and blowing head in cooperation and coordination with the operations of the molds. The slide 27 is provided with a wear plate 32 fixed thereto and forming the upper face thereof, said plate having sliding contact with the lower face of the arm 28. The slide 27 is yieldingly held against said arm by means of bolts 33 (Figs. 6, 8 and 9) which extend downward through openings in said arm and through slots or elongated openings 34 in the slide, the lower ends of said bolts having screw threaded connection with strips 35 which bear against the lower face of the slide. Coil springs 36 surrounding the bolts 33 maintain a yielding pressure of the slide against the arm 28.

Air under pressure is supplied from any suitable source through a pipe 37 (Fig. 6) to a port or opening 38 which connects with a vertical opening 39 in the center of the valve block 28, the port 39 opening vertically downward. With the valve slide in the position shown in Fig. 1, the port 39 communicates with one end of a U-shaped channel 40 formed in the slide, the other end of said channel 40 being in register with a channel 41 formed in the arm 28 and extending to the piston motor casing where it registers with a passageway 42 (see Fig. 4) extending upward through the motor casing and terminating in an opening 43 in the motor cylinder at or near the upper end thereof. A passageway 44 extends from the lower end of the motor cylinder through the motor casing to a horizontal channel 45 extending lengthwise of the arm 28 and terminating at a port 46. A throttle valve 47 (see Figs. 1 and 10) serves to restrict the passageway 45 for a purpose which will appear hereinafter. Said valve comprises a screw bolt 48 adjustable to restrict the passage 45 to any desired extent, a lock nut 49 serving to hold the bolt in adjusted position.

The piston rod 20 is formed with a central bore 50 extending throughout its length and opening at its upper end into the air cylinder above the piston 19. The lower end of the bore 50 is closed by a screw plug 51. A channel 52 is formed in the block 23 and opens at one end into the passageway 50. A duct 53 extends upward from the interior of the blowing head 15 and into the block 23 and has communication with the channel 52 through a port 54 controlled by an automatic valve 55 which, when seated as shown in Fig. 3, shuts off communication between the duct 53 and channel 52. The valve 55 is made hollow or in the form of a tube within which is a coil spring 56 for holding the valve against its seat. The spring is held in position and under tension by a rod or stem 57 having a telescoping connection with the valve, said rod having a screw threaded portion 58 engaging a correspondingly threaded socket 59 formed in the valve block 23. A hand wheel 60 on said stem permits the tension of the spring 56 to be adjusted.

The operation of the piston motor and blowing head, when the valve slide 27 is moved to the Fig. 1 position, is as follows: The motor piston 19 is at this time at the upper limit of its stroke, as shown in Fig. 4, a coil spring 61 within the motor cylinder being under compression between the piston and upper head of the cylinder. As the valve slide is moved to the Fig. 1 position, an air line is established from the pressure pipe 37 (Fig. 6) to the upper end of the motor cylinder. Said air line may be traced through the passageways 39, 40, 41 and 42, so that air under pressure is admitted through the port 43 above the piston and forces the latter downward. The spring 61 being under compression materially assists in accelerating the initial downward movement of the piston. A throttle valve 62, which may be identical in construction with the valve shown in Fig. 10, is located in the passageway 41 and restricts the flow of air to the motor cylinder. This prevents the full pressure of the line 37 being built up in the motor cylinder during the downward movement of the piston. In this connection, it is to be noted that the area of the piston is sufficient to permit it to be moved downward with a comparatively low air pressure, it being noted also that this pressure is supplemented by the spring 61 which acts effectively during the initial downward movement to overcome the inertia of the downwardly moving parts, and the weight of said parts assists in moving the blowing head 15 downward until it seats on the neck mold 16. When the blowing head seats on the neck mold, arresting the downward movement of the piston 19, the air pressure above said piston is quickly built up. The blowing head is thereby firmly held against the neck mold, said head being provided on its under surface with a gasket or lining 63 of asbestos composition or other suitable material to make a tight seal. The universal joint connection between the blowing head and the valve block 23 permits the blowing head to automatically adjust itself to the neck mold.

When air is admitted to the motor cylinder above the piston, as above described, the pressure is transmitted through the hollow piston rod and the channel 52 so that the pressure is applied against the spring held valve 55. This pressure during the downward movement of the piston is insufficient to unseat the valve, so that no air is admitted to the blowing head. However, as soon as the blowing head is seated on the neck mold and the air pressure builds up, as above noted, it overcomes the resistance of the spring 56 so that the valve opens and air under pressure is admitted to the blowing head and operates to expand the parison of glass in the finishing mold 17. During the downward movement of the piston 19, the air beneath the piston is exhausted through an air line comprising a passageway 44, channel 45 and a by-pass channel 65, to the atmosphere. A limited amount of the air also passes the throttle valve 47 and discharges through a duct 66 in the valve slide.

After the bottle has been blown in the finishing mold and the blowing head has remained seated on the neck mold the required length of time, the cam 30 operates to move the valve slide 27 to the Fig. 4 position, thereby reversing the air connections to the piston motor and causing the piston to move upward and lift the blowing head. The air pressure line may now be traced from the pipe 37 through the passageways 39, 40, 46, 45 and 44 to the lower end of the motor cylinder 18. Air under pressure is thereby supplied beneath the piston so that the latter moves upward. The air above the piston is exhausted through the line 42, 41 and a duct 67 in the valve slide. As the opening of this exhaust line relieves or reduces the pressure above the piston, the pressure in the channel 52 (Fig. 3) is also reduced and permits the valve 55 to be closed by the spring 56. The throttle valve 47 operates to restrict the rate at which air is supplied beneath the piston and thereby controls the speed at which the parts move upward. The back pressure built up above the piston as it moves upward is limited, however, by the opening of the valve 55 (Fig. 3) when the pressure reaches a certain degree, so that the exhaust air can escape through the by-pass 50 in the piston rod. The spring 61 acts as a buffer to slow down the piston and bring it to a stop at the end of its upward stroke without pounding or jar.

After the blowing head 15 has been lifted from the neck mold 16, the latter is opened and swung to one side, out of the path of the blowing head. The neck mold may comprise separable sections as is usual in machines of this type. The specific construction of the neck mold and its operating means are not shown herein as they form no part of the present invention. After the neck mold has been swung to one side, the valve slide 27 is again moved to the Fig. 1 position so that the blowing head is again lowered, this time until it seats directly on the finishing mold 17, and air under pressure is again supplied through the blowing head to effect a final blowing operation. This serves to fully expand the bottle or other blown article and the air pressure is maintained until the glass has cooled and hardened sufficiently to retain its shape.

Sometimes it is desired to temporarily hold one or more of the blowing heads on the machine in an elevated position either while the machine is running or while stationary, for the purpose of changing parts, making repairs, etc. In Figs. 1 and 2 is shown a latch mechanism for this purpose. This mechanism comprises a latch 70 pivotally mounted in a bracket 71 secured to a frame 72 to which the piston motor is attached. The latch is yieldingly held between coil springs 73 carried in a yoke 74 pivotally mounted on the bracket 71 for rocking movement about the axis of the latch 70. A hand lever 75 pivoted to the bracket 71 is formed with cam lugs 76 and 77 which cooperate with a cam surface 78 formed on the part 74. The latch 70 is adapted to engage a keeper 79 which, as shown, is a lug formed on the valve block 23, for holding the blowing head and parts which move therewith in their elevated position.

The operation of the latch mechanism is as follows: During the normal operation of the machine, the lever 75 is in its lowered position (Fig. 1) in which the lug 77 engages the upper portion of the yoke plate 74 and holds the latter tilted back so that the latch 70 is out of the path of the lug 79. The piston motor and parts carried therewith can, therefore, operate without interference from the latch mechanism. When it is desired to lock the motor piston and associated parts in their elevated position, the handle 75 is lifted to the Fig. 2 position, thereby disengaging the lug 77 and causing the lug 76 to engage the plate 74 and swing it downward about its pivot so that the latch 70 is swung inward into the path of the lug 79. If the blowing head is now moved upward, the outer inclined face of the lug 79 engages the latch 70 and swings it back against the tension of the spring 73. When the lug 79 has passed the latch, the latter snaps inward to engage beneath said lug, thus locking the blowing head and associated parts in their upper position.

It will be noted that the hand lever 75 can readily be swung up while the machine is in operation, and this is ordinarily done when it is desired to bring the latch mechanism into use, so that the piston motor is operated by its own power to bring the parts to locking position. In order to release the latch 70, the hand lever 75 is swung downward to the Fig. 1 position. The springs 73 permit this movement of the plate 74 without releasing the latch while the latter is held in locking position by the weight of the parts supported thereby. When, however, air pressure is supplied beneath the motor piston, the latter will be lifted and release the latch, allowing it to swing back out of the path of the lug 79, it being noted that the latch holds the parts a short distance below their uppermost position.

Modifications may be resorted to within the spirit and scope of my invention.

What I claim is:

1. In a glass forming machine, the combination of an air motor comprising a vertically disposed cylinder, a piston movable up and down therein, a piston rod, a blowing head carried by said rod, a latch normally held in inoperative position, and manually operated means to set said latch and cause it to automatically lock the piston rod and associated parts in their elevated position when moved to said position.

2. In a glass forming machine, the combination of an air motor comprising a vertically disposed cylinder, a piston movable up and down therein, a piston rod, a blowing head carried by said rod, a latch having a stationary mounting relative to the motor cylinder, a keeper for said latch movable up and down with the motor piston, and manual means for moving the latch into the path of the keeper and causing it to automatically engage the keeper and hold the motor piston and parts moving therewith in their elevated position.

Signed at Toledo, Ohio, this 17th day of October, 1928.

RUSSELL G. ALLEN.